US009455479B2

(12) United States Patent
Guen (10) Patent No.: US 9,455,479 B2
(45) Date of Patent: Sep. 27, 2016

(54) RECHARGABLE BATTERY HAVING A FUSE

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 129 days.

(21) Appl. No.: 14/149,950

(22) Filed: Jan. 8, 2014

(65) Prior Publication Data

US 2015/0072186 A1    Mar. 12, 2015

(30) Foreign Application Priority Data

Sep. 10, 2013  (KR) ................. 10-2013-0108590

(51) Int. Cl.
| H01M 6/12 | (2006.01) |
| H01M 6/46 | (2006.01) |
| H01M 2/14 | (2006.01) |
| H01M 2/02 | (2006.01) |
| H01M 10/42 | (2006.01) |
| H01M 2/26 | (2006.01) |
| H01M 2/34 | (2006.01) |
| H01M 10/04 | (2006.01) |
| H01M 10/058 | (2010.01) |

(52) U.S. Cl.
CPC ............ *H01M 10/425* (2013.01); *H01M 2/26* (2013.01); *H01M 2/34* (2013.01); *H01M 10/0413* (2013.01); *H01M 10/058* (2013.01); *H01M 2200/103* (2013.01)

(58) Field of Classification Search
CPC . H01M 2/021; H01M 2200/103; H01M 2/30
USPC .......................................... 429/57, 178, 211
See application file for complete search history.

(56) References Cited

U.S. PATENT DOCUMENTS 6,432,575 B1 * 8/2002 Yamagami ............ H01M 2/34
429/100
7,718,308 B2    5/2010 Senda et al.

FOREIGN PATENT DOCUMENTS

| EP | 2348558 A1 | 7/2011 |
| EP | 2348559 A1 | 7/2011 |
| EP | 2372808 A1 | 10/2011 |
| EP | 2393145 A1 | 12/2011 |
| EP | 2544265 A1 | 3/2012 |
| EP | 2506334 A1 | 10/2012 |
| EP | 2787562 A1 | 10/2013 |
| EP | 2793293 A1 | 10/2013 |
| KR | 10-2003-0033212 A | 5/2003 |
| KR | 10-2011-0109769 A | 10/2011 |
| KR | 10-06-2013-0006274 A | 1/2013 |
| KR | 10-2013-0012627 A | 2/2013 |
| WO | WO 02/099827 A1 | 12/2002 |

OTHER PUBLICATIONS

European Search Report dated Jan. 21, 2015.

* cited by examiner

*Primary Examiner* — Patrick Ryan
*Assistant Examiner* — Julian Anthony
(74) *Attorney, Agent, or Firm* — Lee & Morse, P.C.

(57) ABSTRACT

A rechargeable battery includes an electrode assembly including a first electrode and a second electrode, a case configured to store the electrode assembly, a cap plate attached to the case, a terminal electrically connected to the first electrode and protruding out of the cap plate, a current collecting member connecting the first electrode with the terminal, the current collecting member including a fuse portion, a lower insulating member between the cap plate and the current collecting member, and a barrier between the lower insulating member and the fuse portion.

15 Claims, 8 Drawing Sheets

RECHARGABLE BATTERY HAVING A FUSE

CROSS-REFERENCE TO RELATED APPLICATION

Korean Patent Application No. 10-2013-0108590, filed on Sep. 10, 2013, in the Korean Intellectual Property Office, and entitled: "Rechargeable Battery Having a Fuse," is incorporated by reference herein in its entirety.

BACKGROUND

1. Field

The described technology relates generally to a rechargeable battery. More particularly, the described technology relates generally to a rechargeable battery having a fuse.

2. Description of the Related Art

A rechargeable battery differs from a primary battery in that it can be repeatedly charged and discharged, while the latter is incapable of being recharged. A low-capacity rechargeable battery is used in small portable electronic devices, e.g., mobile phones, laptop computers, and camcorders, while a high-capacity rechargeable battery is widely used as a power source, e.g., for driving a motor of a hybrid vehicle and the like.

A high power rechargeable battery using a non-aqueous electrolyte with high energy density has been developed, and the high power rechargeable battery is formed by coupling a plurality of rechargeable batteries in series to be used as a power source for driving a motor of a device requiring a large amount of electric power, e.g., an electric vehicle and the like. In addition, a high-capacity battery module normally includes a plurality of rechargeable batteries connected in series, and a rechargeable battery may be formed in a cylindrical or prismatic shape.

SUMMARY

A rechargeable battery according to an exemplary embodiment includes an electrode assembly including a first electrode and a second electrode, a case configured to store the electrode assembly, a cap plate attached to the case, a terminal electrically connected to the first electrode and protruding out of the cap plate, a current collecting member connecting the first electrode with the terminal, the current collecting member including a fuse portion, a lower insulating member between the cap plate and the current collecting member, and a barrier between the lower insulating member and the fuse portion.

A fuse hole is formed in the current collecting member, the barrier may be formed to be elongated in a circumferential direction of the fuse hole, and the fuse portion may be formed at both lateral ends of the fuse hole.

The current collecting member may be provided with a supporting member which blocks a lower part of the fuse hole, and the supporting member may be provided to enclose the current collecting member and be formed with an opening connected to the fuse hole so that an upper part of the fuse hole is opened.

The current collecting member includes an upper connecting portion bonded to the terminal and a lower connecting portion bent at the upper connecting portion and thereby extended down, and the supporting member is provided to enclose the connecting part of the upper connecting portion and the lower connecting portion.

The barrier may be formed protruding toward the lower insulating member from the supporting member, and the barrier may be formed protruding toward the current collecting member from the lower insulating member.

The lower insulating member includes: an upper plate; a lateral side which protrudes from a lateral end of the upper plate and thereby encloses a lower flange and the current collecting member; and a stepped portion which is disposed above the supporting member and protrudes down from the upper plate.

The barrier is formed protruding from the stepped portion, the stepped portion is separated from the supporting member, and the supporting member may be formed with a first groove in which the barrier is inserted.

The lower part of the barrier is inserted in the first groove, and the lower insulating portion may be formed with a second groove in which the upper part of the barrier is inserted.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
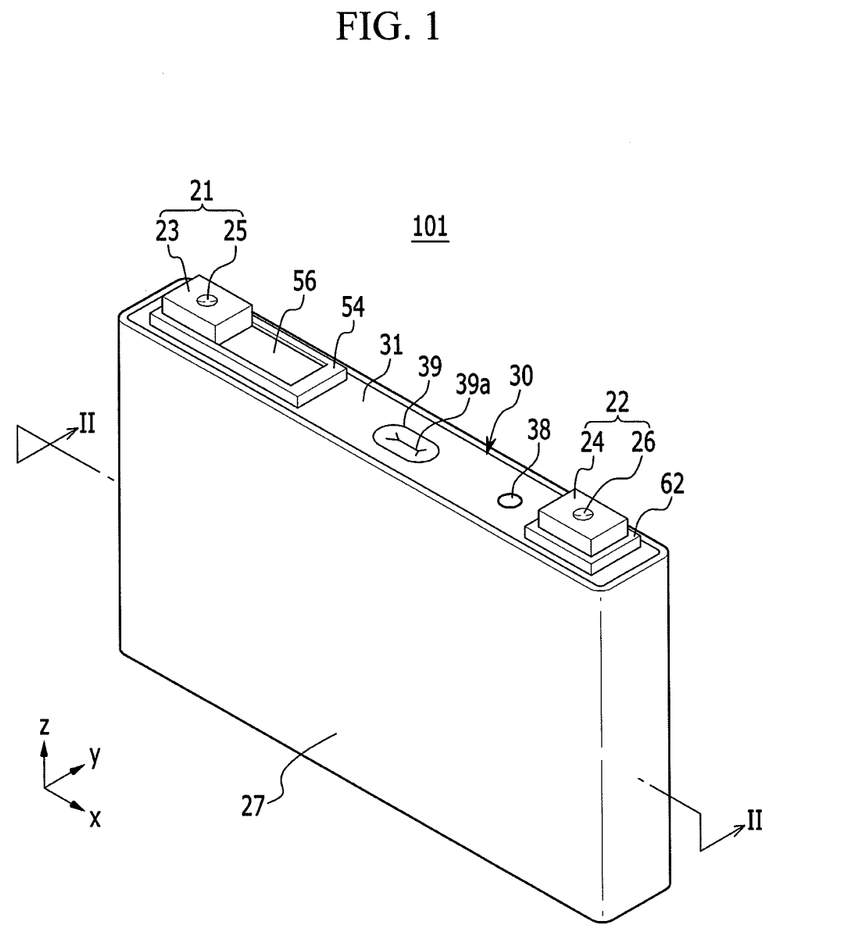
FIG. 1 illustrates a perspective view of a rechargeable battery according to a first exemplary embodiment.
Figure 2:
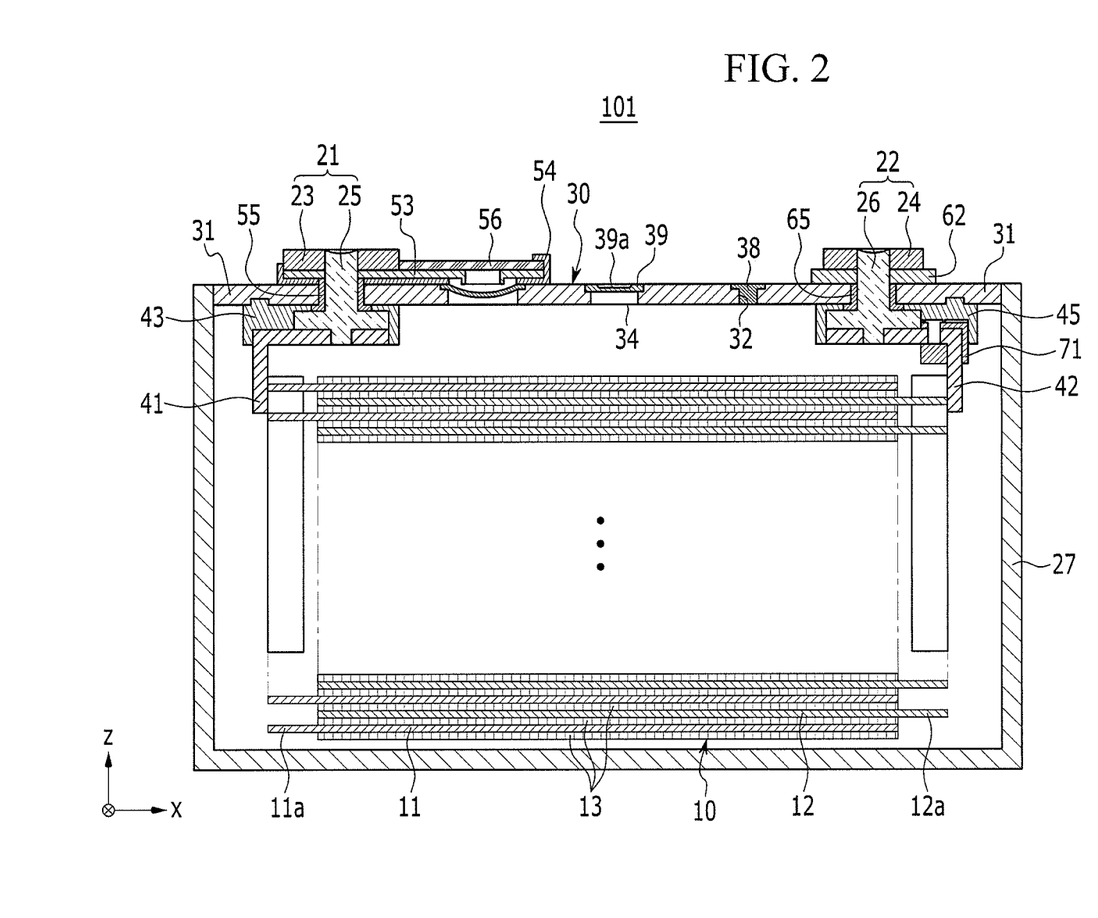
FIG. 2 illustrates a cross-sectional view of FIG. 1, taken along the line II-II.

FIG. 1 illustrates a perspective view of a rechargeable battery according to a first exemplary embodiment, and FIG. 2 illustrates a cross-sectional view of FIG. 1, taken along the line II-II.

Referring to FIG. 1 and FIG. 2, a rechargeable battery 101 according to the first exemplary embodiment may include an electrode assembly 10 wound by interposing a separator 13 between a negative electrode 11 and a positive electrode 12, a case 27 in which the electrode assembly 10 is stored, and a cap assembly 30 combined, e.g., attached, to an opening of the case 27.

The rechargeable battery 101 according to the first exemplary embodiment is exemplarily illustrated as a prism-shaped lithium ion rechargeable battery. However, embodiments are not limited thereto, e.g., the rechargeable battery 101 may be applied to various types of batteries such as a lithium polymer battery or a cylindrical battery and the like.

The negative electrode (first electrode) 11 and the positive electrode (second electrode) 12 include coated regions where an active material is coated on a current collector formed of a thin metal foil, and uncoated regions 11a and 12a where an active material is not coated. The negative electrode uncoated region 11a is formed at one lateral end of the negative electrode 11 along a length direction thereof, and the positive uncoated region 12a is formed at the other lateral end of the positive electrode along a length direction thereof. The negative electrode 11 and the positive electrode 12 are wound by interposing the separator 13, which operates as an insulator, between them. However, embodiments are not limited thereto, and the electrode assembly 10 may be formed in a layered structure in which the negative electrode and the positive electrode, respectively formed of a plurality of sheets, are layered by interposing the separator between them.

The case 27 may be roughly formed in a shape of a cuboid, and the opening may be formed at one side. For example, the case 27 may be made of metal, e.g., aluminum, stainless steel, and the like.

The cap assembly 30 may include a cap plate 31 covering the opening of the case 27, a first terminal 21 protruding out of the cap plate 31 and electrically connected to the negative electrode 11, and a second terminal 22 protruding out of the cap plate 31 and electrically connected to the positive electrode 12.

The cap plate 31 is formed in an elongated plate shape in one direction, and is combined to the opening of the case 27. The cap plate 31 may include a sealing cap 38 provided in an electrolyte injection opening 32, and a vent plate 39 provided in a vent hole 34 and formed with a notch 39a which is set to be opened at a predetermined pressure.

The first terminal 21 and the second terminal 22 are provided to protrude above the cap plate 31. The first terminal 21 is electrically connected to the negative electrode 11 through a current collecting member 41, and the second terminal 22 is electrically connected to the positive electrode 12 through a current collecting member 42. However, embodiments are not limited thereto, and the first terminal 21 may be electrically connected to the positive electrode while the second terminal 22 may be electrically connected to the negative electrode.

The first terminal 21 may include an externally exposed outer terminal 23, and a connecting terminal 25 which is disposed below the outer terminal 23 and bonded to the current collecting member 41. The outer terminal 23 may be formed in a plate shape, and the connecting terminal 25 may penetrate the outer terminal 23 and is fixed thereto. The connecting terminal 25 penetrates the cap plate 31, so an upper part of the connecting terminal 25 contacts the outer terminal 23 and is fixed thereto, and a lower part of the connecting terminal 25 is fixed to the current collecting member 41 by welding.

A gasket 55 for sealing is provided between the connecting terminal 25 and the cap plate 31 and is inserted in the hole which the connecting terminal 25 penetrates. A lower insulating member 43 is provided under an inner side of the cap plate 31 so as to insulate the first terminal 21 from the current collecting member 41 at the cap plate 31.

A short-circuit tab 53 is electrically connected to the first terminal 21, and is disposed on the cap plate 31. An upper insulating member 54 is provided between the short-circuit tab 53 and the cap plate 31 for electrical insulation. The outer terminal 23 is disposed at one side of the short-circuit tab 53, and a protecting cover 56 is provided at the other side of the short-circuit tab 53.

The second terminal 22 may include an externally exposed outer terminal 24 and a connecting terminal 26. The outer terminal 24 may be formed in a plate shape, and the connecting terminal 26 may penetrate the outer terminal 24 and is fixed thereto.

Figure 3:
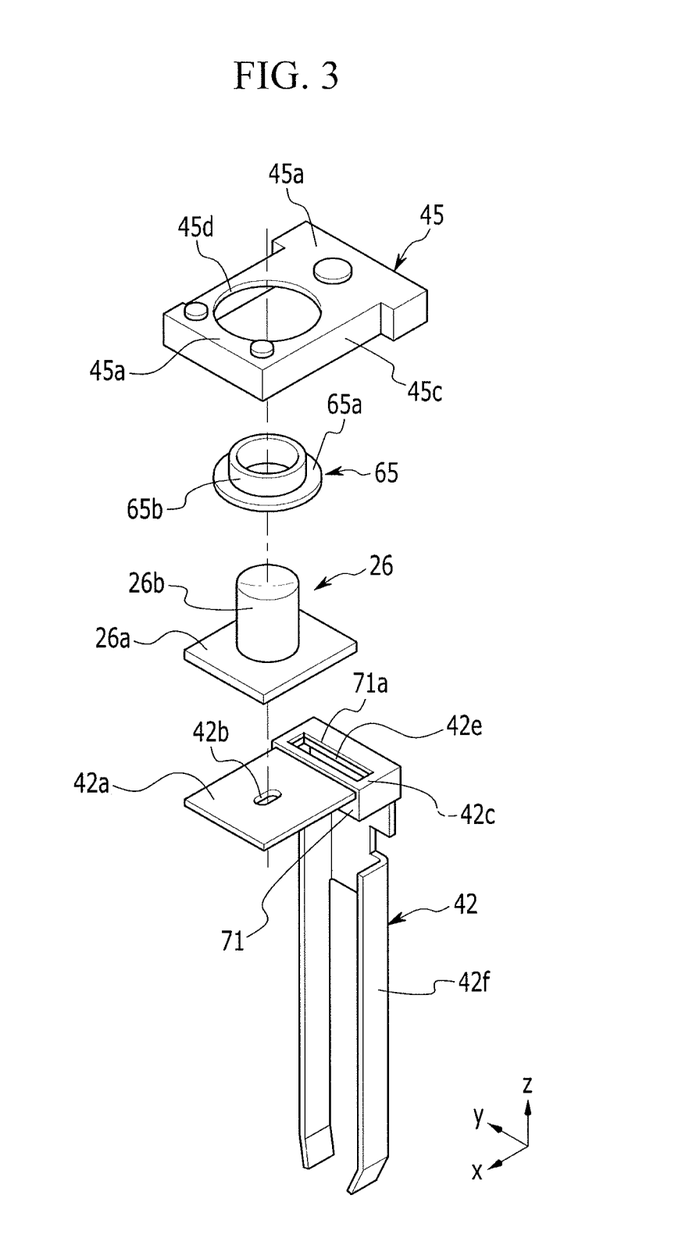
FIG. 3 illustrates an exploded perspective view of a part of the rechargeable battery according to the first exemplary embodiment.
Figure 4:
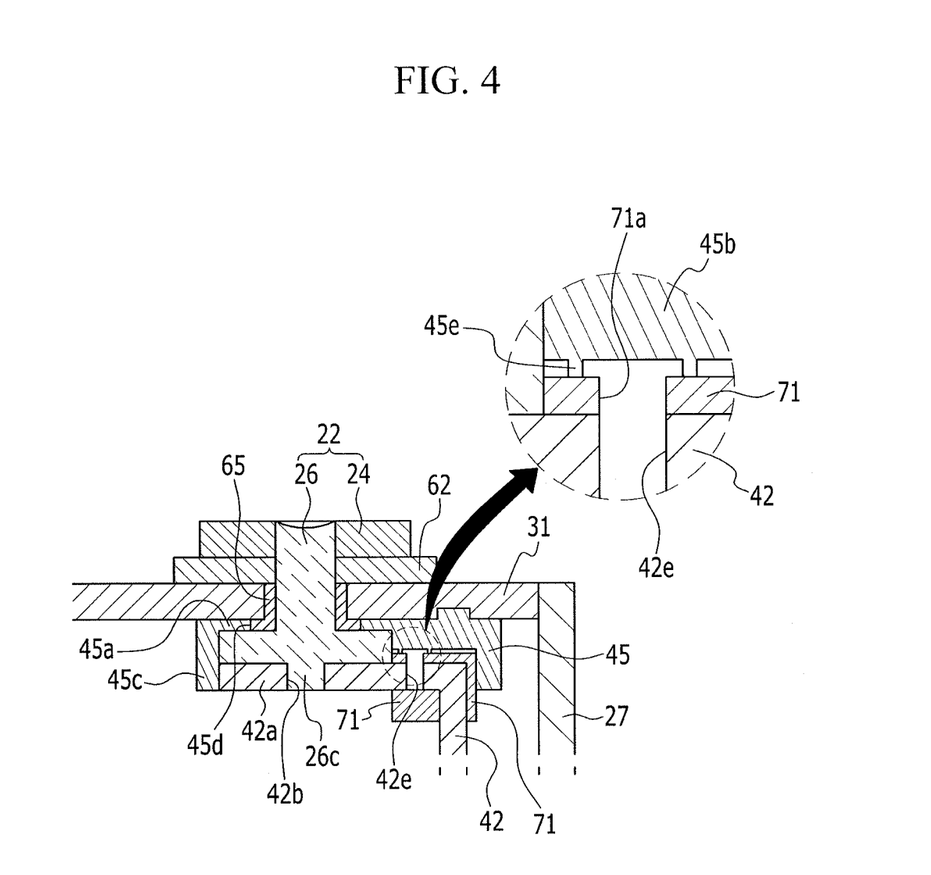
FIG. 4 illustrates a cross-sectional view of a part of the rechargeable battery according to the first exemplary embodiment.

As shown in FIG. 3 and FIG. 4, the connecting terminal 26 may include a column portion 26b penetrating the cap plate 31, such that the column portion 26b contacts the outer terminal 24 and is fixed thereto, and a lower flange 26a protruding outwardly from a lower part of the column portion 26b. A lower protrusion 26c protrudes from a bottom side of the lower flange 26a downwardly, and is inserted in the current collecting member 42 to be affixed thereto by welding.

A gasket 65 for sealing is provided between the connecting terminal 26 and the cap plate 31 and is inserted in the hole which the connecting terminal 26 penetrates, and a lower insulating member 45 is provided under an inner side of the cap plate 31 so as to insulate the second terminal 22 from the current collecting member 42 at the cap plate 31. As illustrated in FIG. 3, the gasket 65 may include an upper insulating portion 65b, which encloses the column portion 26b, and a lower insulating portion 65a, which contacts a top side of the lower flange 26a.

Figure 5:
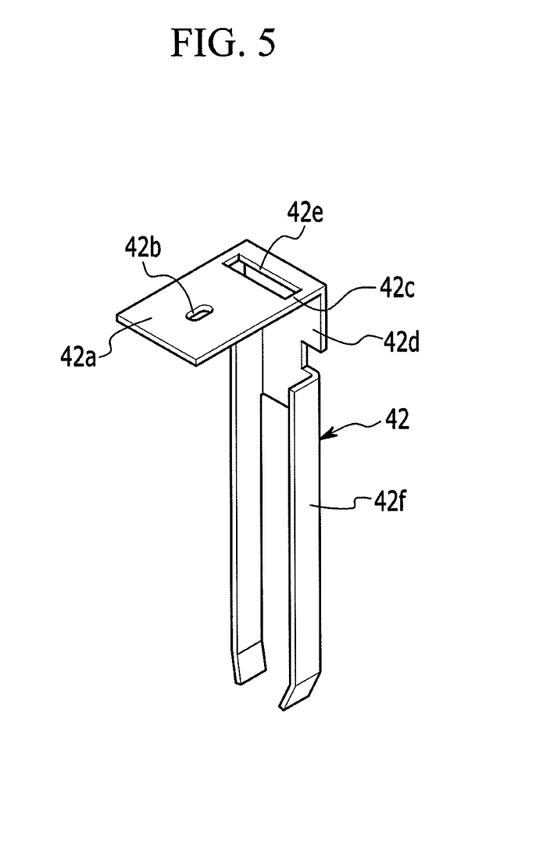
FIG. 5 illustrates a perspective view of a current collecting member according to the first exemplary embodiment.

As shown in FIGS. 3 and 5, the current collecting member 42 may include an upper connecting portion 42a, which is bonded by welding to the lower flange 26a, a lower connecting portion 42d, which is bent from the upper connecting portion 42a and extended downwardly, and a current collecting protrusion 42f, which is bent from the lower connecting portion 42d and is fixed to the positive electrode uncoated region 12a. The upper connecting portion 42a is formed with a welding hole 42b, in which the lower protrusion 26c formed at a lower part of the lower flange 26a is inserted. The lower protrusion 26c is fixed by welding to the upper connecting portion 42a after being inserted in the welding hole 42b.

The upper connecting portion 42a is formed with a fuse portion 42c, which has a smaller cross-sectional area than a periphery area. That is, a fuse hole 42e is formed in the current collecting member 42, and the fuse portion 42c is connected and formed at both lateral ends of the fuse hole 42e. Accordingly, the fuse portion 41c has a smaller cross-sectional area than the periphery area. However, embodiments are not limited thereto, and the fuse portion 42c may be formed with a groove and the like.

When an overcurrent flows through the current collecting member 42, the fuse portion 42c in the current collecting member 42 melts, thereby cutting off current through the current collecting member 42. As a result, battery safety is improved.

According to example embodiments, the fuse portion 42c is provided with a supporting member 71 which encloses the fuse portion 42c, e.g., the supporting member 71 may completely enclose the fuse portion 42c with the exception of the fuse hole 42e. The supporting member 71 is provided on the current collecting member 42 to enclose the periphery of the fuse portion 42c, e.g., to enclose a connecting part of the upper connecting portion 42a and the lower connecting portion 42d.

The supporting member 71 may include an opening 71a connected with the fuse hole 42e. The supporting member 71 is formed to block a lower part of the fuse hole 42e, and an upper part of the fuse hole 42e is opened through the opening 71a. For example, as illustrated in FIG. 4, the supporting member 71 may include a first portion on, e.g., directly on, top surfaces of the upper connecting portion 42a and the fuse portion 42c, such that the opening 71a and the fuse hole 42e overlap, e.g., completely overlap, each other. Further, the supporting member 71 may include a second portion connected to the first portion and extending on lower surfaces of the upper connecting portion 42a and the fuse portion 42c, such that the second portion blocks, e.g., completely covers, a bottom of the fuse hole 42e.

The width of the second portion of the supporting member 71 disposed on the lower part of the fuse portion 42c is thicker, e.g., along the z axis in FIG. 2, than that of the first portion of the supporting member 71 disposed on the upper part of the fuse portion 42c. The supporting member 71 is created by insert injection molding, and is made of a polymer material.

Figure 6:
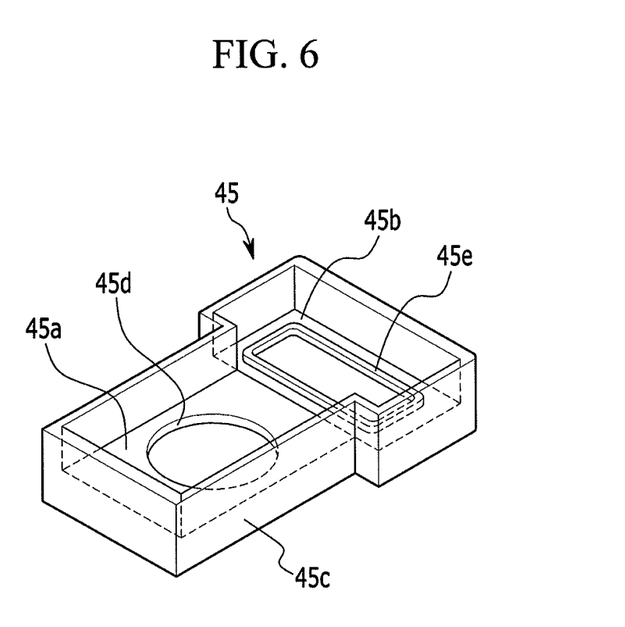
FIG. 6 illustrates a perspective view of a lower insulating member of the rechargeable battery, viewed from the bottom, according to the first exemplary embodiment.

FIG. 6 illustrates a perspective view of the lower insulating member 45 viewed from the bottom. That is, the view of the lower insulating member 45 in FIG. 6 is inverted relative to FIG. 3.

Referring to FIGS. 3 and 6, the lower insulating member 45 may include an upper plate 45a, a lateral side 45c protruding down from an end of the upper plate 45a and enclosing the lower flange 26a and the current collecting member 42, and a stepped portion 45b protruding down from the upper plate 45a and disposed above the supporting member 71. The upper plate 45a is provided to cover a top side of the lower flange 26a, and the stepped portion 45b has a larger width than the upper plate 45a (along the y-axis in FIG. 3) and is disposed above the supporting member 71.

The upper plate 45a is formed with a terminal hole 45d, in which the column portion 26a is inserted, and the gasket 65 is inserted into the terminal hole 45d along with the column portion 26b. A barrier 45e is formed protruding toward the current collecting member 42 in the stepped portion 45b, and is elongated in a ring shape.

The barrier 45e serves to separate the lower insulating member 45 from the supporting member 71, and a bottom side of the stepped portion 45b is separated from the supporting member 71. As illustrated in the enlarged section of FIG. 4, the barrier 45e is formed to enclose the circumference of an upper space of the fuse hole 42e, and the fuse hole 42e is closed and sealed by the barrier 45e and the supporting member 71 as a result.

According to embodiments, the supporting member 71 is positioned on the current collecting member 42. Since the current collecting member 42 may exhibit lower rigidity due to the fuse hole 42e therethrough, the supporting member 71 on the current collecting member 42 may increase stability and rigidity of the current collecting member 42, thereby preventing the current collecting member 42 from being deformed or damaged due to external impact or the like.

Further, according to embodiments, the supporting member 71 separates between the current collecting member 42 and the electrolyte. That is, when an overcurrent flows through the current collecting member 42 due to a short-circuit, overcharge, and the like, the fuse portion 42c melts, thereby generating a first arc. If arc residues melted by the arc generation drop down and contact an electrolyte solution, the possibility of fire is highly increased. However, as the supporting member 71 separates between the current collecting member 42 and the electrolyte, the supporting member 71 prevent the arc residues from contacting the electrolyte solution.

Moreover, since the fuse portion 42c and the fuse hole 42e are closed and sealed by the lower insulating member 45, air inflow is blocked, thereby decreasing or blocking arc generation. In particular, since the barrier 45e is formed at a connecting part of the lower insulating member 45 and the supporting member 71, the lower insulating member 45 is separated from a heating source, such that it can be prevented from being melted by heat. As a result, even if a stronger secondary arc is generated after the first arc generation, oxygen deficiency prevents the rechargeable battery 101 from catching fire.

According to a melting experiment of the fuse portion 42c, the secondary arc which is created by the melting part, after the fuse portion 42c is completely melted, is larger than the first arc generated while the fuse portion 42c is being melted. Accordingly, when the secondary arc is generated, there is a greater risk of catching fire inside the rechargeable battery 101. However, according to the present exemplary embodiment, even if the first arc is generated, since the lower insulating member 45 is not melted and the fuse portion 42c is closed by sealing, the rechargeable battery is prevented from catching fire or exploding when the secondary arc is generated due to oxygen deficiency.

Figure 7:
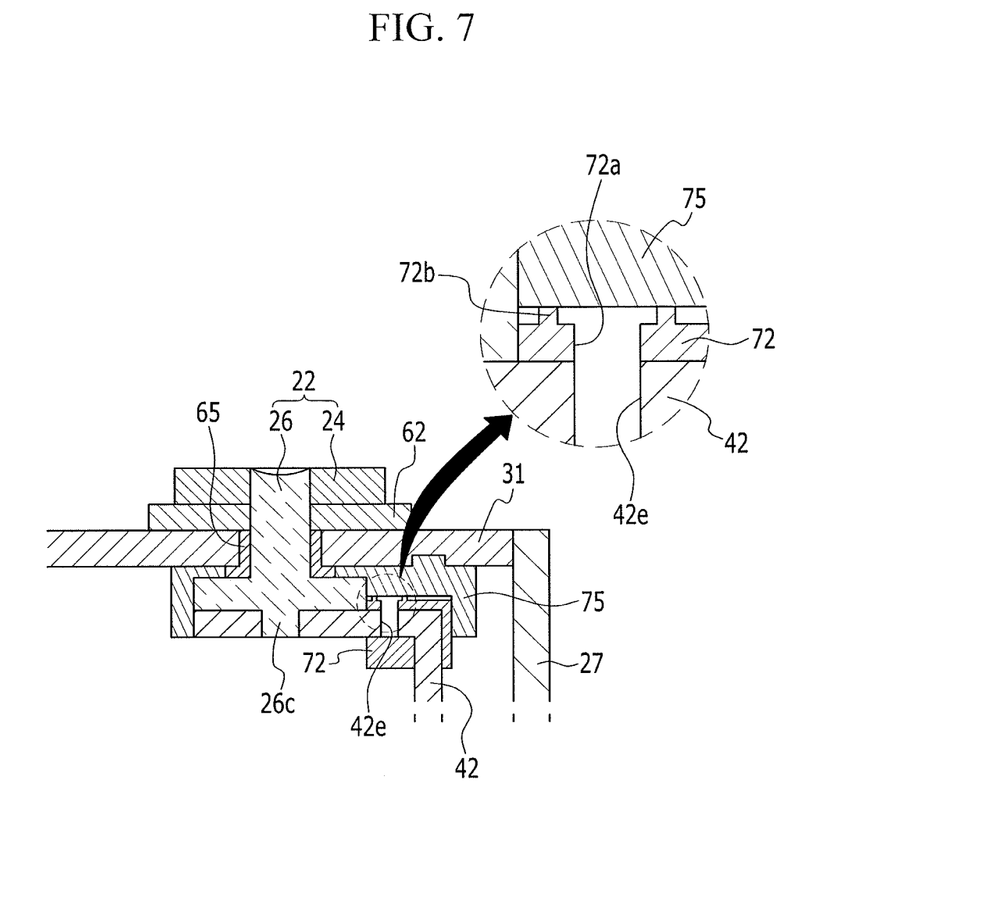
FIG. 7 illustrates a cross-sectional view of a part of a rechargeable battery according to a second exemplary embodiment.

FIG. 7 illustrates a cross-sectional view of a part of a rechargeable battery according to a second exemplary embodiment. Since the rechargeable battery according to the present exemplary embodiment has the same structure as the rechargeable battery according to the first exemplary embodiment, except for the structure of a supporting member 72 and a lower insulating member 75, a repeated description of the same structure is omitted.

Referring to FIG. 7, the supporting member 72 according to the second exemplary embodiment is provided to enclose the periphery of the fuse portion 42c, such that it is installed at a connecting part of the upper connecting portion 42a and the lower connecting portion 42d. The supporting member 72a is provided with an opening 72a overlapping an upper part of the fuse hole 42e, and is formed to block, e.g., overlap, a lower part of the fuse hole 42e. That is, the upper part of the fuse hole 42e is open through the opening 72a.

A width of the supporting member 72 disposed at the lower part of the fuse portion 42c is greater than that of the supporting member disposed at the upper part of the fuse portion 42c. The supporting member 72 may be created by insert injection molding, and is made of a polymer material.

The periphery of the opening 72a is formed with a barrier 72b protruding toward the lower insulating member 75. The barrier 72b is formed in an elongated ring shape to enclose the circumference of the opening 72a, and protrudes upwards. The barrier 72b serves to separate the lower insulating member 75 from the supporting member 72, and is formed to enclose the circumference of the upper space of the fuse hole 42e.

The fuse hole 42e is closed and sealed by the supporting member 72 and the lower insulating member 75. The lower insulating member 75 insulates the cap plate 31 from the current collecting member 42, and is provided to cover the lower flange and the supporting member 72. The lower insulating member 75 contacts the barrier 72b so as to close and seal the fuse hole 42e, and is disposed apart from the supporting member 72 by the barrier 72b.

Figure 8:
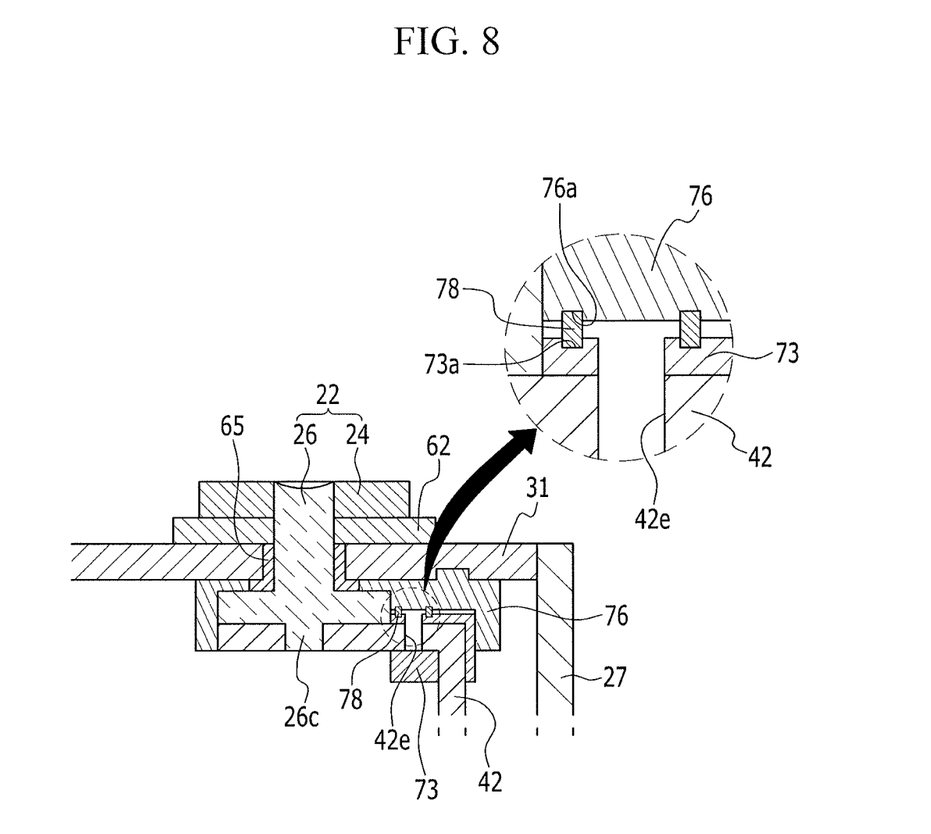
FIG. 8 illustrates a cross-sectional view of a part of a rechargeable battery according to a third exemplary embodiment.

FIG. 8 illustrates a cross-sectional view of a part of a rechargeable battery according to a third exemplary embodiment. Since the rechargeable battery according to the third exemplary embodiment has the same structure as the rechargeable battery according to the first exemplary embodiment, except for the structure of a supporting member 73 and a lower insulating member 76, a repeated description of the same structure is omitted.

The supporting member 73 according to the third exemplary embodiment is provided to enclose the periphery of the fuse portion 42c at the current collecting member 42, such that it is installed at the connecting part of the upper connecting portion 42a and the lower connecting portion 42d. The supporting member 73 is formed with an opening 73a and is provided to block the lower part of the fuse hole 42e, and the upper part of the fuse hole 42e is opened through the opening 73a.

A width of the supporting member 73 disposed at the lower part of the fuse portion 42c is greater than that of the supporting member 73 disposed at the upper part of the fuse portion 42c. The supporting member 73 may be created by insert injection molding, and is made of a polymer material.

The periphery of the opening 73a is formed with a first groove 73b into which a barrier 78 is inserted, and the first groove 73b is elongated to enclose the circumference of the opening 73a. The lower part of the barrier 78 is formed to be inserted into the first groove 73b, and is elongated in a ring shape in a circumferential direction of the opening 73a. The barrier 78 serves to separate the lower insulating member 76 from the supporting member 73, and is formed to enclose the circumference of the upper space of the fuse hole 42e.

Accordingly, the fuse hole 42e is closed and sealed by the supporting member 73, the lower insulating member 76, and the barrier 78. The lower insulating member 76 separates the cap plate 31 from the current collecting member 42, and is provided to cover the lower flange 26a and the supporting member 73. The lower insulating member 76 is formed with a second groove 76a into which the barrier 78 is inserted. The second groove 76a is formed to be elongated in a circumferential direction of the opening 73a.

Accordingly, the lower part of the barrier 78 is inserted into the first groove 73b, and the upper part of the barrier 78 inserted into the second groove 76a. The lower insulating member 76 contacts the barrier 78 and thereby closes and seals the fuse hole 42e, and is disposed apart from the supporting member 73 by the barrier 78.

According to an exemplary embodiment, a rechargeable battery, which can prevent members neighboring the fuse from being melted when the fuse is melted, provided. That is, a barrier is formed between a lower insulating member and a current collecting member, thereby blocking the lower insulating member from heat generated by melting of the fuse portion. Accordingly, the lower insulating member is prevented from melting when the fuse portion melts. Moreover, since the fuse hole is closed and sealed by a supporting member and the lower insulating member, ignition or explosion of the rechargeable battery may be prevented when a secondary arc is generated.

In contrast, when an overcurrent flows due to a short circuit and the like through a conventional current collecting member, a fuse inside the rechargeable battery melts. However, due to high heat generated during the melting of the fuse, members adjacent to the melting fuse may melt as well. Further, a secondary arc may be generated between the melted members, thereby causing ignition or explosion of the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a first electrode and a second electrode;
a case configured to store the electrode assembly;
a cap plate attached to the case;
a terminal electrically connected to the first electrode and protruding out of the cap plate;
a current collecting member connecting the first electrode with the terminal, the current collecting member including a fuse portion;
a lower insulating member between the cap plate and the current collecting member; and
a barrier between the lower insulating member and the fuse portion,
wherein the lower insulating member is above the fuse portion and overlaps the fuse portion, the barrier vertically separating the lower insulating member and the fuse portion.

2. The rechargeable battery as claimed in claim 1, wherein the current collecting member is internal to the case in its entirety, a lower portion of the terminal contacting the current collecting member inside the case, and an upper portion of the terminal protruding through the cap plate to be external to the case.

3. The rechargeable battery as claimed in claim 1, wherein the barrier directly extends from the lower insulating member toward the fuse portion to define an empty space between the lower insulating member and the fuse portion.

4. A rechargeable battery, comprising:
an electrode assembly including a first electrode and a second electrode;
a case configured to store the electrode assembly;
a cap plate attached to the case;
a terminal electrically connected to the first electrode and protruding out of the cap plate;
a current collecting member connecting the first electrode with the terminal, the current collecting member including a fuse portion;
a lower insulating member between the cap plate and the current collecting member; and
a barrier between the lower insulating member and the fuse portion,
wherein the current collecting member further comprises a fuse hole, the barrier extending in a circumferential direction of the fuse hole.

5. The rechargeable battery as claimed in claim 4, wherein the fuse portion is at two lateral ends of the fuse hole.

6. The rechargeable battery as claimed in claim 4, wherein the current collecting member further comprises a supporting member, the supporting member overlapping a lower part of the fuse hole.

7. The rechargeable battery as claimed in claim 6, wherein the supporting member encloses the current collecting member, the supporting member including an opening overlapping and in fluid communication with an upper part of the fuse hole.

8. The rechargeable battery as claimed in claim 7, wherein the current collecting member further comprises:
   an upper connecting portion bonded to the terminal; and
   a lower connecting portion bent at the upper connecting portion and extending downwardly from the upper connecting portion, the supporting member enclosing a connecting part of the upper connecting portion and the lower connecting portion.

9. The rechargeable battery as claimed in claim 6, wherein the barrier protrudes toward the lower insulating member from the supporting member.

10. The rechargeable battery as claimed in claim 6, wherein the barrier protrudes toward the current collecting member from the lower insulating member.

11. The rechargeable battery as claimed in claim 10, wherein the lower insulating member includes:
    an upper plate;
    a lateral side protruding from a lateral end of the upper plate, the lateral side enclosing a lower flange portion of the terminal and a portion of the current collecting member; and
    a stepped portion above the supporting member, the stepped portion protruding down from the upper plate.

12. The rechargeable battery as claimed in claim 11, wherein the barrier protrudes from the stepped portion, the stepped portion being disposed apart from the supporting member.

13. The rechargeable battery as claimed in claim 6, wherein the supporting member includes a first groove, the barrier being inserted in the first groove.

14. The rechargeable battery as claimed in claim 13, wherein a lower part of the barrier is inserted in the first groove, and the lower insulating member includes a second groove in which an upper part of the barrier is inserted.

15. A rechargeable battery, comprising:
    an electrode assembly including a first electrode and a second electrode;
    a case configured to store the electrode assembly;
    a cap plate attached to the case;
    a terminal electrically connected to the first electrode and protruding out of the cap plate;
    a current collecting member connecting the first electrode with the terminal, the current collecting member including a fuse portion;
    a lower insulating member between the cap plate and the current collecting member; and
    a barrier between the lower insulating member and the fuse portion,
    wherein the fuse portion is between the lower insulating member and the electrode assembly, the lower insulating member covering the fuse portion.

* * * * *